US006462975B1

(12) United States Patent
Cheng et al.

(10) Patent No.: US 6,462,975 B1

(45) Date of Patent: Oct. 8, 2002

(54) FOLDABLE TRANSFORMER

(75) Inventors: YungFu Cheng, Tu-Chen (TW); Fu-Shen Shen, Tu-Chen (TW); Ming-Yu Hung, Tu-Chen (TW)

(73) Assignee: Hon Hai Precisionind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/954,110

(22) Filed: Sep. 12, 2001

(30) Foreign Application Priority Data

May 23, 2001 (TW) .......................................... 90208383

(51) Int. Cl.[7] ................................................ H02M 1/00

(52) U.S. Cl. ...................................................... 363/146

(58) Field of Search ................................ 363/144, 146; 439/620

(56) References Cited

U.S. PATENT DOCUMENTS 4,954,940 A * 9/1990 Chandler et al. ........... 363/146
5,159,545 A * 10/1992 Lee ............................ 363/146
5,243,510 A * 9/1993 Chemey, II ................. 363/146
RE35,190 E * 3/1996 Zylstra et al. .............. 363/146
5,838,554 A * 11/1998 Lanni .......................... 363/21
5,973,948 A * 10/1999 Hahn et al. ................. 363/146
6,086,395 A * 7/2000 Lloyd et al. ................ 439/172
6,091,611 A * 7/2000 Lanni .......................... 363/21
6,266,261 B1 * 7/2001 Liao ........................... 363/144

* cited by examiner

*Primary Examiner*—Adolf Deneke Berhane
(74) *Attorney, Agent, or Firm*—Wei Te Chung

(57) ABSTRACT

A foldable transformer includes an enclosure (10), a plug assembly (12), and a locating assembly (14). The enclosure has a storage cavity (16) at a top end thereof. A window (20) is defined in the enclosure in communication with a bottom portion of the storage cavity, for receiving the plug assembly therethrough. The plug assembly includes a pair of inserting pins (34), a rotatable rod (36) having an arched profile, a pair of metal ears (38), and a pair spring pins (44). Each inserting pin is made of conductive material, is insert-molded in the rod, and electrically connects with a corresponding ear. The locating assembly includes a pair of slots (48) for receiving the spring pins, and a cam (56) for resiliently engaging with the plug assembly so that the plug assembly can be disengagably fixed in a folded position or an unfolded position.

17 Claims, 9 Drawing Sheets

FOLDABLE TRANSFORMER

BACKGROUND OF THE INVENTION

1. Field of the Invention

The present invention relates to AC-DC transformers where the AC power supply is of the type commonly available in homes, offices and the like, and the DC power supply is compatible with electronic devices such as radios, cellular telephones and the like. In particular, the present invention relates to transformers having a plug for plugging into a typical AC power source outlet, wherein the plug is foldable so that the transformer can be compactly stored when not in use.

2. Description of the Prior Art

Power transformers are often used with portable devices, and have been developed to be easily transported along with portable devices. Accordingly, such transformers are typically small, light, convenient to manufacture and safe to use.

A conventional foldable transformer is shown in FIG. 7. The transformer includes a housing 100 having a storage cavity 102 at a top end thereof, a plug assembly 103, and wires 108. The plug assembly 103 is moveable between a folded position for storage and an unfolded position for use. The plug assembly 103 includes a rotatable rod 106, and a pair of pins 104 for connecting with an external power source. The pins 104 are made of conductive material, and are insert-molded in the rod 106. The wires 108 are respectively soldered at each end of the pins 104 in the rod 106. Thus the pins 104 can both rotate together with the rod 106 between the folded position and the unfolded position, and are easily connected with the wires 108 to transmit power from an external source to a power transforming circuit (not shown) within the transformer itself. Because the pins 104 and the wires 108 are soldered together, rotation of the pins 104 generates stress to the solder joints between the wires 108 and the pins 104. After repeated use, the solder joints are liable to become fatigued. Electrical connection between the wires 108 and the pins 104 may be lost, whereupon power transmission from the pins 104 through the wires 108 to the power transforming circuit is lost. Thus the transformer is prone to be unreliable after repeated use.

Another conventional transformer is shown in FIG. 8. The transformer includes a housing 200 having a storage cavity 202 at a top portion thereof, and a plug assembly 203. The plug assembly 203 further comprises a pair of rotary pins 204, a pair of fixed pins 206, a rotatable transverse rod 208, an engaging block 210, and a spring 212. Each rotary pin 204 is pivotally connected to a corresponding fixed pin 206 via a pivot located at an end of the rod 208. The rotary pins 204 are pivotally foldable while maintaining constant electric connection with the fixed pins 206. The rod 208 also has a groove 209, and the engaging block 210 has an engaging ridge 211 for engaging in the groove 209. A blind hole 213 is defined in a side of the engaging block 210 opposite to the engaging ridge 211, for receiving one end of the spring 212. The storage cavity 202 further has a pair of pin holes 215 for receiving the fixed pins 206, and an opening 217 for receiving the other end of the spring 212 to thereby fix the plug assembly 203 to the housing 200.

In assembly, each fixed pin 206 is inserted into a corresponding pin hole 215. When the rotary pins 204 and rod 208 are rotated to an unfolded position, the spring 212 exerts force such that the ridge 211 firmly engages in the corresponding groove 209. The pins 204 are thus securely held in position, allowing the plug to be conveniently inserted into an AC power source outlet.

The above-mentioned foldable transformer does not have wires directly soldered to the rotary pins 204. Thus the problem of the transformer of FIG. 7 is resolved. However, the above-mentioned foldable transformer has at least the following drawbacks:

First, it has many components and a complicated structure, making it unduly difficult to manufacture.

Second, the spring 212 is not a reliable component. In particular, the force exerted by various springs 212 is not always constant. Thus the quality of the plug assembly 203 is not always uniform. Secondly, after repeated use of the plug assembly 203, the resiliency of the spring 212 may be reduced to an unworkable level.

Accordingly, a foldable transformer having an improved plug assembly is desired.

SUMMARY OF THE INVENTION

Accordingly, an object of the present invention is to provide a plug assembly for a foldable transformer that has a reduced number of components, is easily assembled and manufactured, and is reliable.

To achieve the above object, a foldable transformer in accordance with a preferred embodiment of the present invention comprises an enclosure, a plug assembly and a locating assembly. The enclosure has a storage cavity at a top end thereof. A window is defined in the enclosure in communication with a bottom portion of the storage cavity, for receiving the plug assembly therethrough. A pair of tabs extends inwardly from the enclosure above the window, and a locating block extends inwardly from each tab. The plug assembly includes a pair of inserting pins, a rotatable rod having an arched profile, a pair of metal ears, and a pair of spring pins. Each inserting pin is made of conductive material, is insert-molded in the rod, and electrically connects with a corresponding ear. A protrusion is formed on a central portion of an apex of an arched surface of the rod. A pair of parallel projections extends outwardly from an arcuate portion of the arched surface of the rod proximate the protrusion. Each spring pin is made by folding a metal strip back over itself. Each spring pin comprises a first portion and a second portion connecting with each other via a neck. A dimple is formed in a free end of the second portion, to increase a contact area between the spring pin the corresponding metal ear. The locating assembly includes a pair of slots for receiving the spring pins, and a cam for resiliently engaging with the plug assembly so that the plug assembly can be disengagably fixed in a folded position or an unfolded position. The locating assembly also includes a pair of locating holes for locating the locating blocks.

DETAILED DESCRIPTION OF THE PRESENT INVENTION

Figure 1:
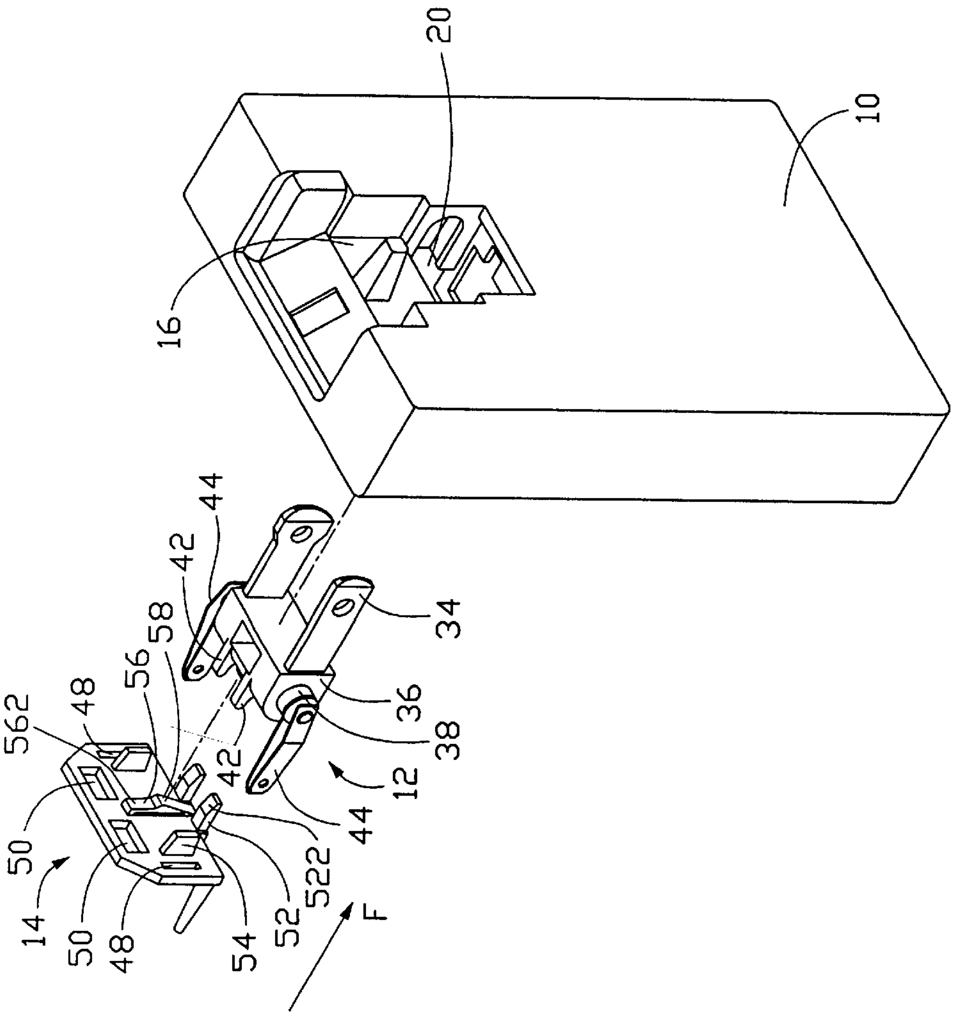
FIG. 1 is an exploded perspective view of a foldable transformer in accordance with the present invention.
Figure 2:
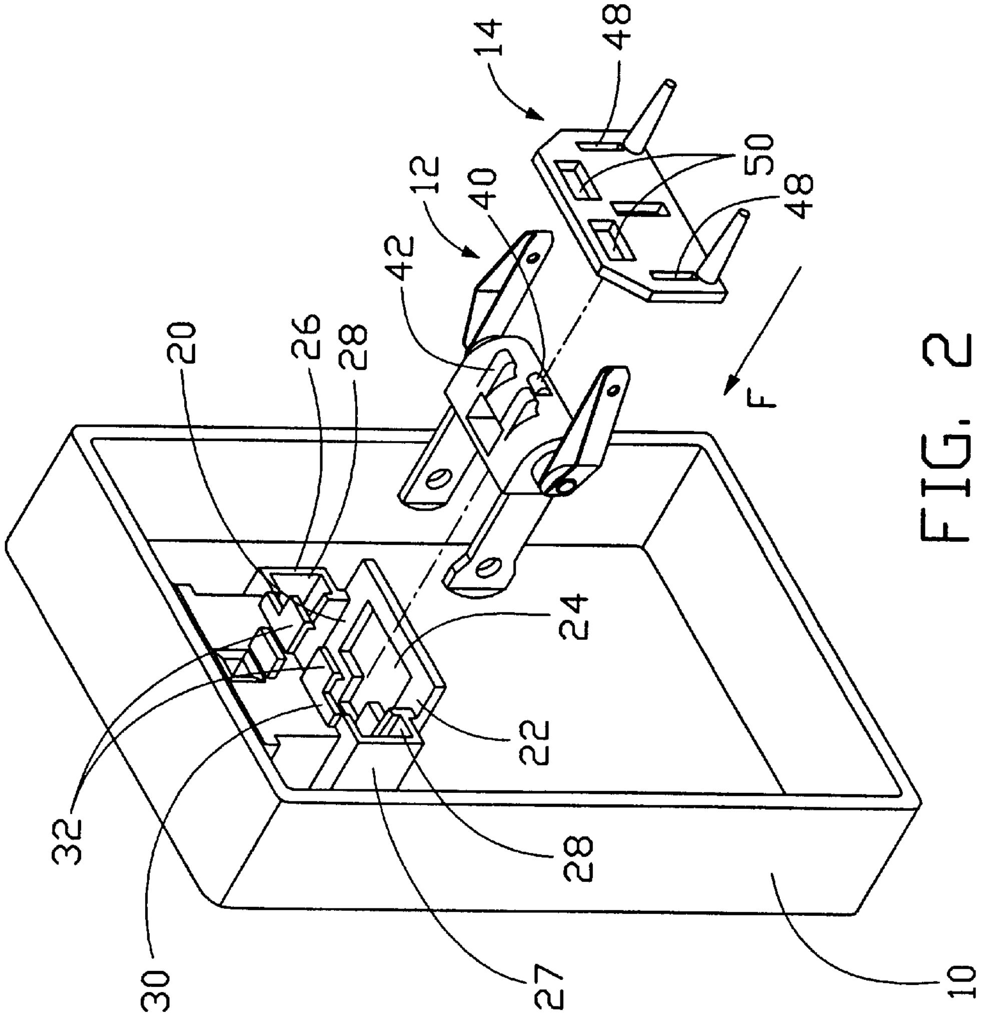
FIG. 2 is similar to FIG. 1, but viewed from another aspect.

Referring to FIGS. 1 and 2, a foldable transformer in accordance with the present invention includes a plug assembly 12, a locating assembly 14 and an insulative enclosure 10. The enclosure 10 is generally box-shaped, and is comprised of electrical insulating material. An electrical circuit (not shown) for electrical power transformation is accommodated in the enclosure 10. A storage cavity 16 is defined at a junction of a top surface and a front surface of the enclosure 10. A rectangular window 20 is defined in the enclosure 10, and is in communication with a lower portion of the cavity 16. The enclosure 10 has a bottom wall 22, a right wall 26, and a left wall 27 all flanking the window 20.

A pair of tabs 30 extends inwardly from the enclosure 10 just above a top extremity of the window 20. A locating block 32 extends inwardly from a free end of each tab 30. A pair of opposing storage depressions 28 is defined in the right and left walls 26, 27 respectively. A receiving opening 24 is defined in the bottom wall 22.

The plug assembly 12 includes a pair of insert-molded inserting pins 34 made of conductive material, a pair of spring pins 44, and a rotatable transverse rod 36 having an arched profile. The inserting pins 34 extend perpendicularly outwardly from a longitudinal planar surface of the rod 36 that is opposite a curved surface of the rod 36.

The locating assembly 14 is a substantially planar plate, and is elastically deformable. A pair of slots 48 is defined in opposite sides of the locating assembly 14, for extension of the spring pins 44 therethrough. A pair of locating holes 50 is defined in a top portion of the locating assembly 14, for extension of the locating blocks 32 therethrough. A cam 56 is formed on a middle of one main face of the locating assembly 14. The cam 56 is resiliently movable. The cam 56 has an upper flat face 562, and a lower slanted face 58. The slanted face 58 is most prominent at a point nearest the flat face 562, and declines in prominence away from the flat face 562. A pair of abutments 54 extends perpendicularly from the main face of the locating assembly 14, for abutting against the rod 36. The abutments 54 are proximate to and between the slots 48. The abutments 54 support the rod 36 against a rearward pushing force acting thereon when the inserting pins 34 are inserted into a power outlet (not shown). A pair of holding blocks 52 extends perpendicularly from a bottom edge of the locating assembly 14, in the same direction as the abutments 54. Each holding block 52 has a sloped face 522 declining toward a free end thereof.

Figure 3:
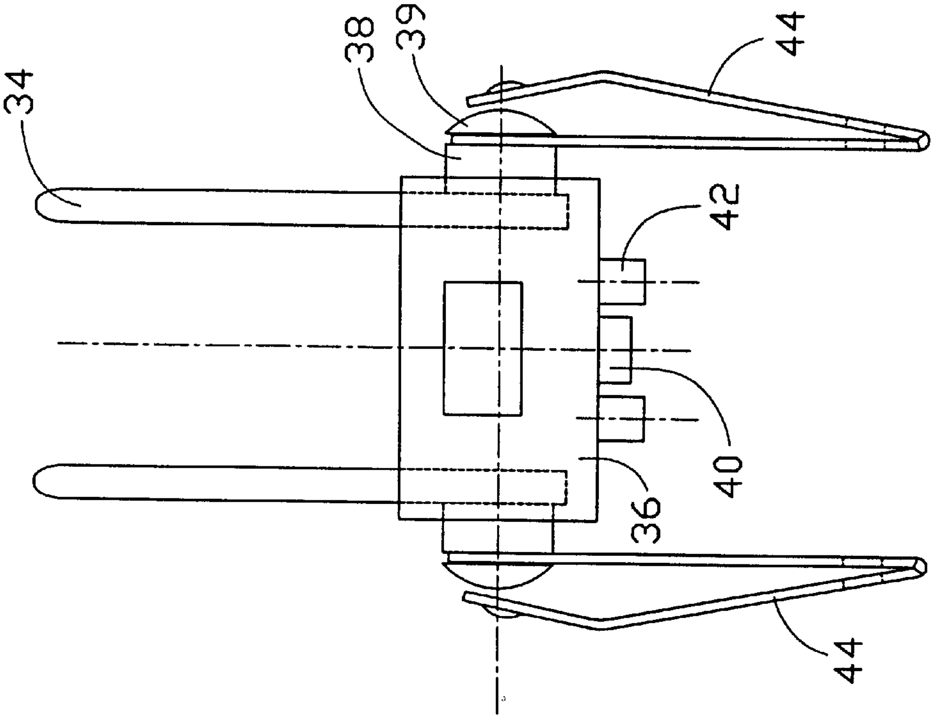
FIG. 3 is a top plan view of a plug assembly of the foldable transformer of FIG. 1.

Referring to FIGS. 2 and 3, the rod 36 includes a pair of insert-molded metal ears 38 fixed at opposite ends thereof respectively. The ears 38 are electrically connected to the spring pins 44 respectively. Each ear 38 has a dome-shaped free end 39. Each ear 38 has an annular groove defined therein at the free end 39, for engagingly receiving a corresponding spring pin 44. A protrusion 40 is formed on a central portion of an apex of the curved surface of the rod 36. The protrusion 40 has an arcuate profile. A pair of parallel projections 42 extends outwardly from the curved surface of the rod 36 proximate the protrusion 40, and in a direction opposite to the direction in which the inserting pins 34 extend from the rod 36.

Figure 4B:
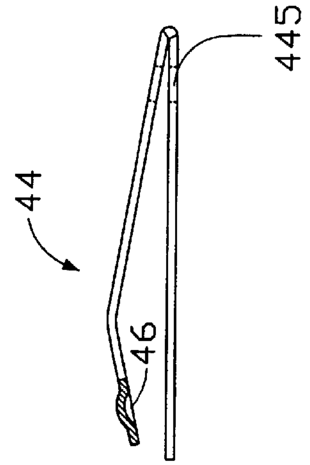
FIG. 4B is a side plan view of the spring pin of FIG. 4A, but showing the spring pin now folded.
Figure 4A:
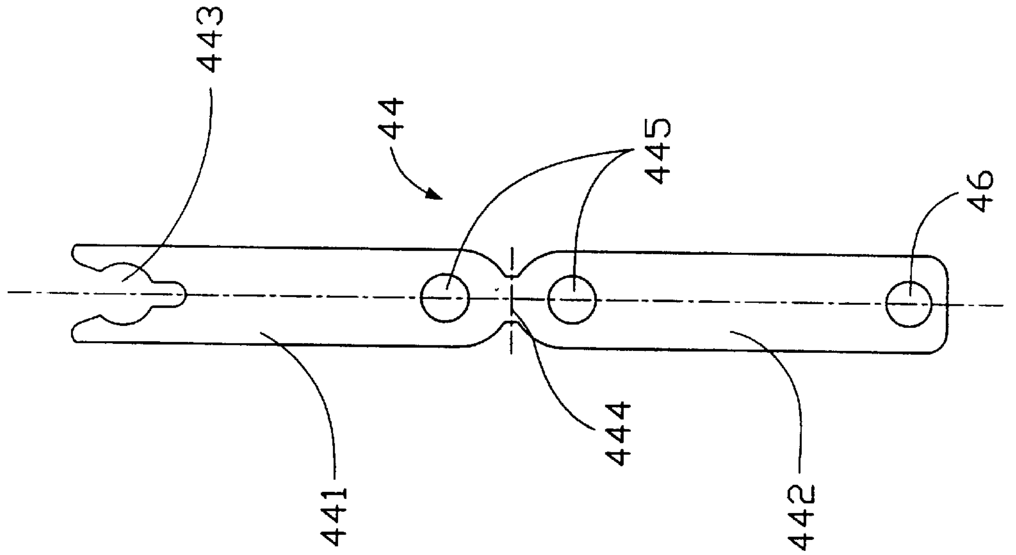
FIG. 4A is a plan view of a spring pin of the plug assembly of FIG. 3, but prior to the spring pin being folded.

Referring to FIGS. 4A and 4B, each spring pin 44 is made by folding a metal strip back over itself. Each spring pin 44 comprises a first portion 441, a second portion 442, and a neck 444 connecting the first and second portions 441, 442. A cutout 443 is defined in a free end of the first portion 441, for pivotally and fittingly receiving the corresponding metal ear 38 at the annular groove of the metal ear 38. A dimple 46 is formed at a free end of the second portion 442. A pair of connection holes 445 is respectively defined in the first and second portions 441, 442, on opposite sides of the neck 444.

In pre-assembly, each spring pin 44 is bent at the neck 444 to double over itself (see FIG. 4B). Then the free end of the first portion 441 is pivotably attached to the metal ear 38. The dimple 46 thus opposes a corresponding free end 39 of the ear 38. The plug assembly 12 is thus fully assembled.

Figure 5A:
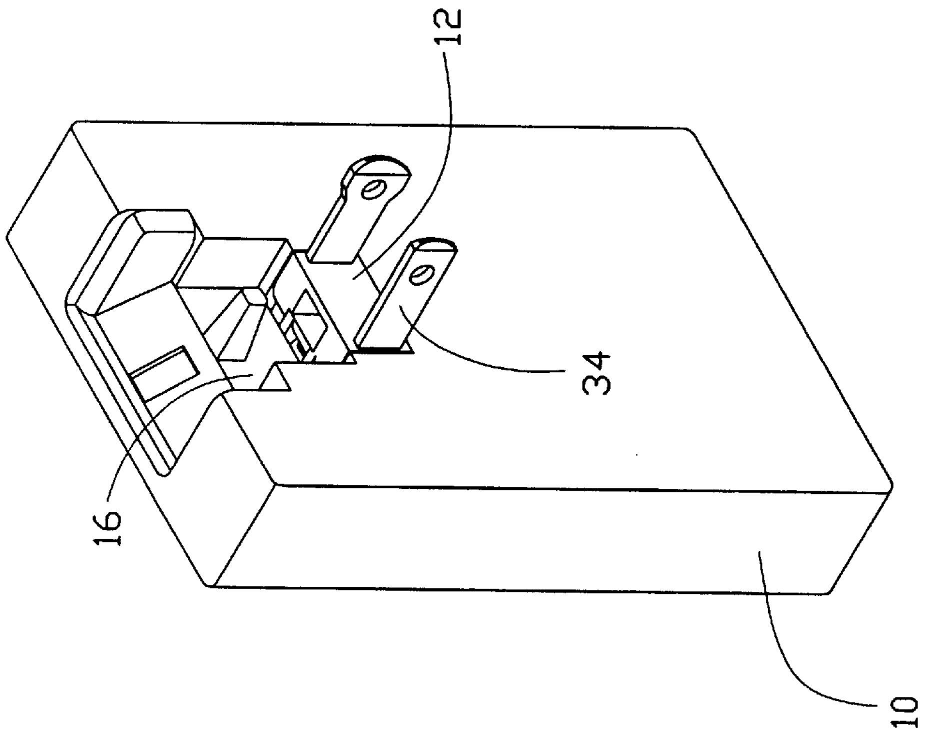
FIG. 5A is an assembled view of FIG. 1.
Figure 5B:
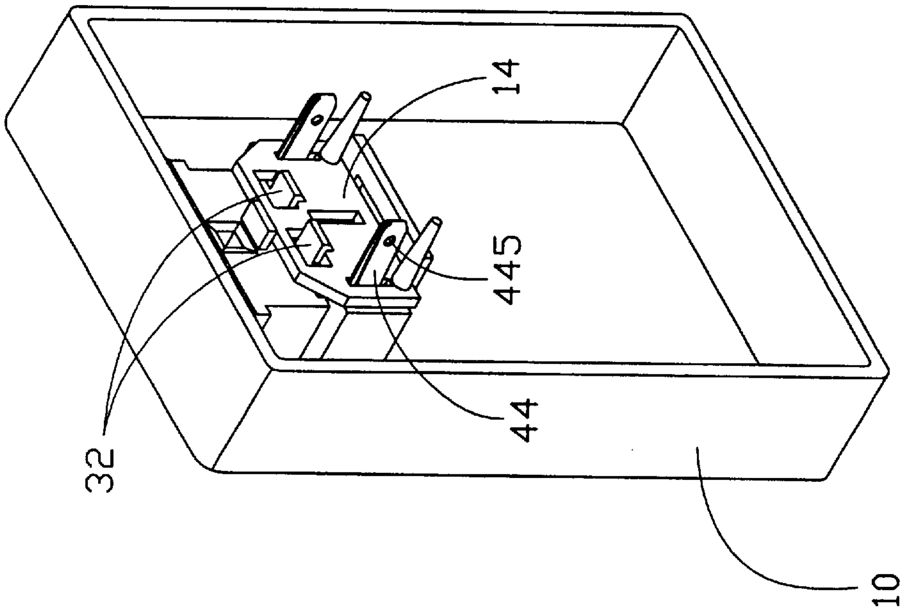
FIG. 5B is an assembled view of FIG. 2.

In assembly, as shown in FIGS. 1 and 2, the plug assembly 12 is firstly inserted into the window 20 of the enclosure 10. The ears 38 of the plug assembly 12 are received in front portions of the storage depressions 28. The right and left walls 26, 27 press the spring pins 44 at the dimples 46 to engage with the free ends 39 of the ears 38. The dimples 46 enable larger surface area contact between the spring pins 44 and the free ends 39. The locating assembly 14 is then attached to the enclosure 10 along direction F. The locating blocks 32 of the enclosure 10 are engagingly extended into the locating holes 50 of the locating assembly 14. The abutments 54 of the locating assembly 14 abut against the central portion of the apex of the curved surface of the rod 36. The spring pins 44 of the plug assembly 12 extend through the slots 48 of the locating assembly 14. Distal ends of the holding blocks 52 extend into the receiving opening 24 of the enclosure 10, and abut against the bottom wall 22 of the enclosure 10. Thus the enclosure 10, the plug assembly 12 and the locating assembly 14 are assembled together, as shown in FIGS. 5A and 5B. The inserting pins 34 protrude out from the storage cavity 16. Thereafter, electrical wires (not shown) are passed through the connection holes 445. The electrical wires are soldered to the spring pins 44. The spring pins 44 are thus securely connected with the electrical circuit for electrical power transformation.

Figure 6B:
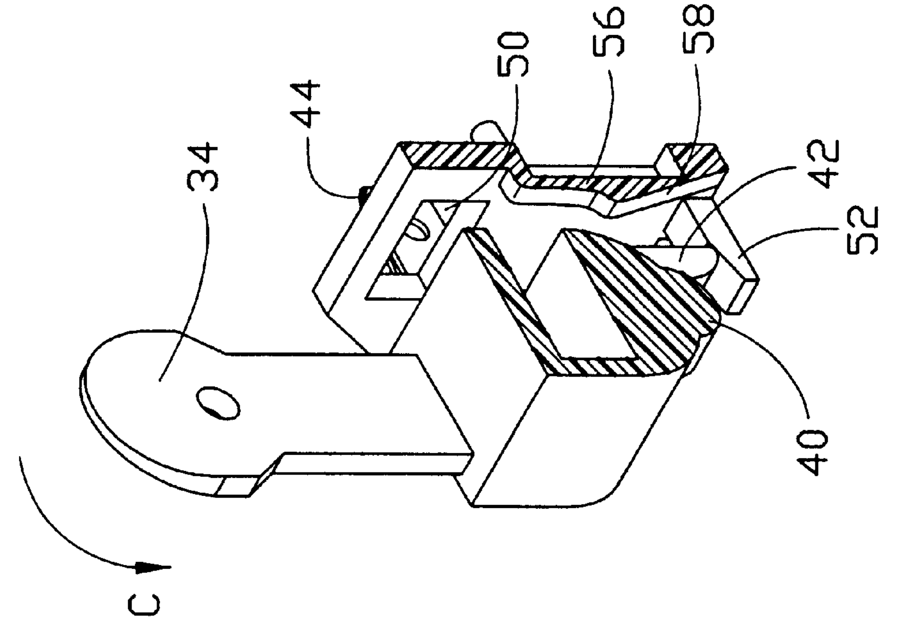
FIG. 6B is similar to FIG. 6A, but showing the plug assembly at a folded position.
Figure 6A:
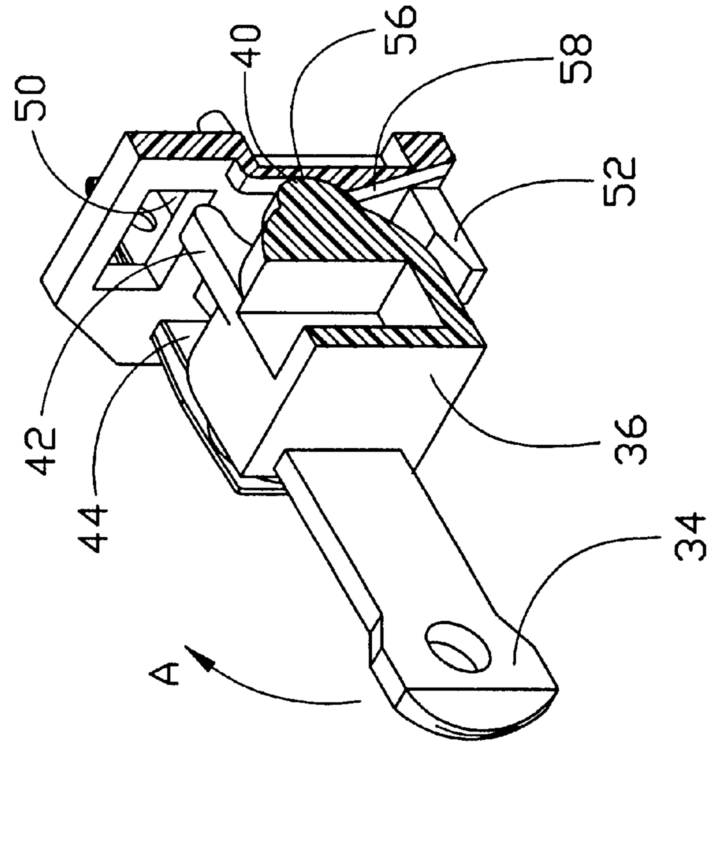
FIG. 6A is a cut-away perspective view of the plug assembly and a locating assembly of the foldable transformer of FIG. 1, showing the plug assembly at an unfolded position.
Figure 7:
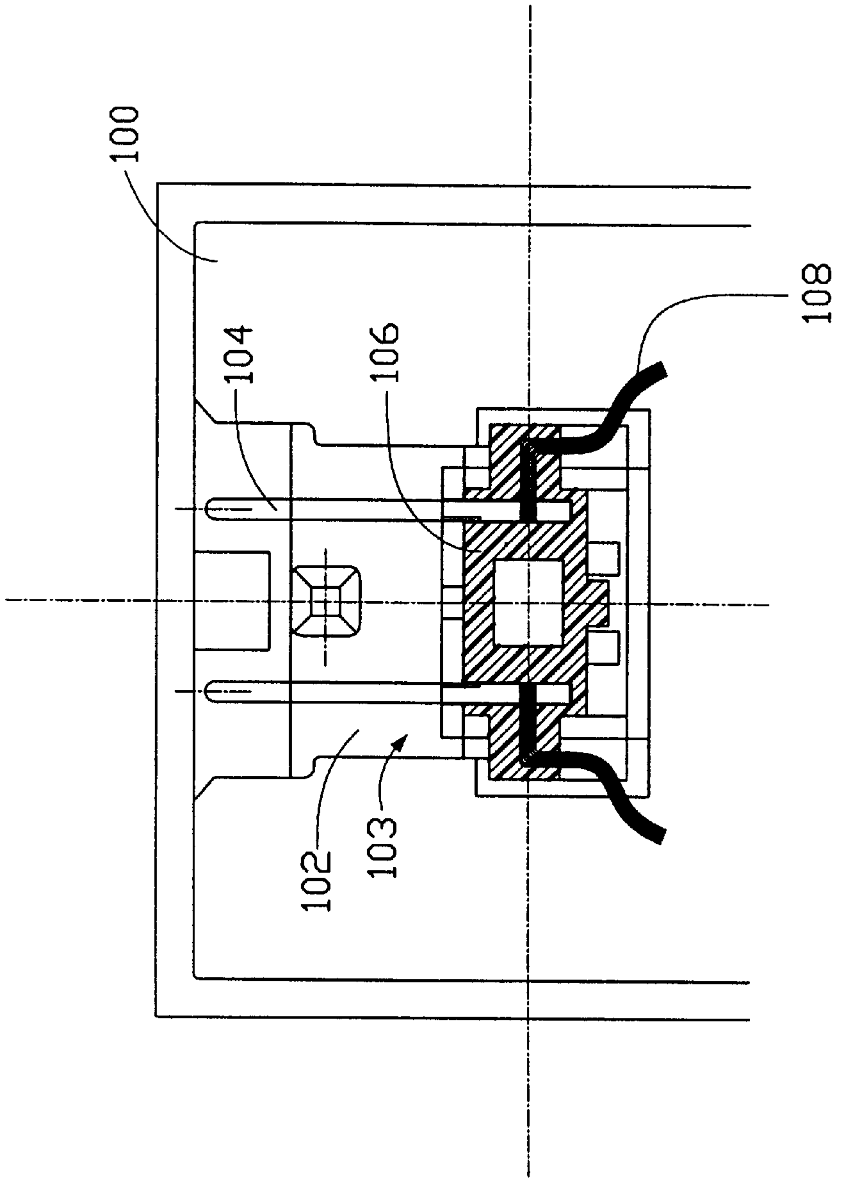
FIG. 7 (PRIOR ART)
FIG. 7 is a partly cut-away front plan view of a conventional foldable transformer.
Figure 8:
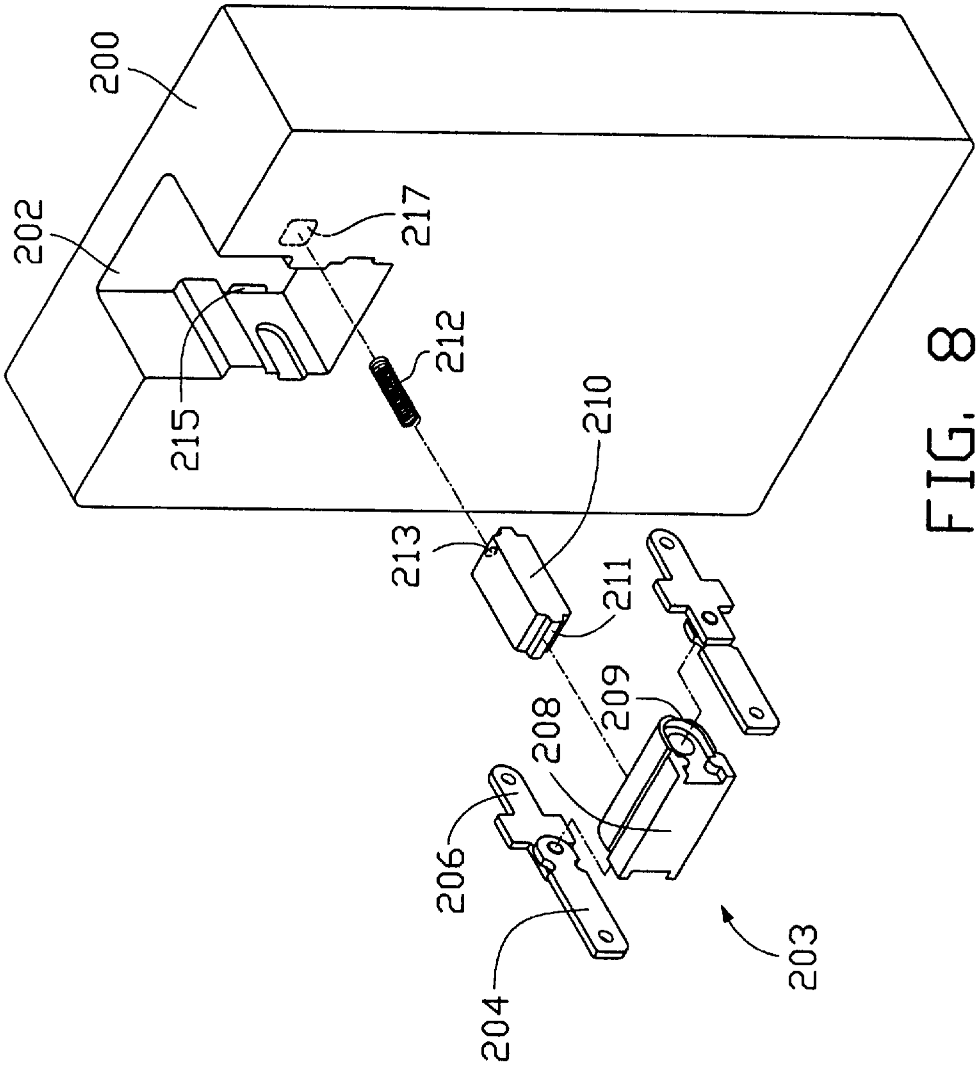
FIG. 8 (PRIOR ART)
FIG. 8 is an exploded perspective view of another conventional foldable transformer.

Referring to FIG. 6A, in use, when the plug assembly 12 is in an unfolded position, the inserting pins 34 protrude perpendicularly outwardly from the storage cavity 16. In this position, the protrusion 40 of the plug assembly 12 is resiliently engaged with the flat face 562 of the cam 56. A step (not labeled) of the cam 56 between the flat face 562 and the slanted face 58 cooperates with the flat face 562 to resiliently retain the plug assembly 14 in this position. When a sufficiently large upward force is applied to the plug assembly 14 in a direction as indicated by arrow A, the plug assembly 14 is rotatingly disengaged from the unfolded position to a folded position where it is completely accommodated in the storage cavity 16 (see FIG. 6B). In this position, the projections 42 are now resiliently engaged with the sloped faces 522 of the holding blocks 52. When a sufficiently large force is applied to the plug assembly 14 in a direction indicated by arrow C (see FIG. 6B), the plug assembly 14 is rotatingly disengaged from the folded position back to the unfolded position.

It is to be understood, that even though numerous characteristics and advantages of the present invention have been set forth in the foregoing description, together with details of the structure and function of-the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A foldable transformer comprising:

an insulative enclosure defining a storage cavity and a window in communication with a lower portion of the cavity;

a plug assembly having an insulative rod, two inserting pins fixed to the rod, two metal ears fixed at opposite ends of the rod and electrically connecting with the inserting pins respectively, and two spring pins, each spring pin having a first end engaging with a corresponding ear, a second end pressed by the enclosure to engage with a corresponding ear, and a bent portion being adapted to be soldered to an electrical wire; and a locating assembly fixed to the enclosure, the locating assembly defining a pair of slots for extension of the bent portions of the spring pins therethrough, the locating assembly further comprising a cam engaging with the rod when the plug assembly is disposed at an unfolded position in which the inserting pins protrude out from the storage cavity, and a pair of holding blocks located below the cam and engaging with the rod when the plug assembly is moved to a folded position in which the inserting pins are accommodated in the storage cavity.

2. The foldable transformer as described in claim 1, wherein a pair of tabs is formed on the enclosure above the window, and each tab forms a locating block securely engaging with the locating assembly.

3. The foldable transformer as described in claim 1, wherein the rod has a protrusion, the protrusion engages with the cam when the plug is at the unfolded position, the rod also has a pair of projections extending from opposite sides of the protrusion respectively, and the projections engage with the holding blocks when the plug is moved to the folded position.

4. The foldable transformer as described in claim 3, wherein the cam includes a slanted face, a flat face and a step between the slanted and flat faces, and the protrusion of the rod engages with the step when the plug assembly is at the unfolded position.

5. The foldable transformer as described in claim 1, wherein the locating assembly includes a pair of locating holes for extension of the locating blocks therethrough.

6. The foldable transformer as described in claim 1, wherein each holding block has a sloped face declining toward a free end thereof, and the projections of the rod engage with the sloped faces of the holding blocks when the plug assembly is rotated to the folded position.

7. The foldable transformer as described in claim 1, wherein the cam is resiliently movable.

8. The foldable transformer as described in claim 7, wherein the protrusion has an arcuate profile.

9. The foldable transformer as described in claim 7, wherein the enclosure further comprises a locating tab extending through the locating assembly and fixedly engaging therewith.

10. The foldable transformer as described in claim 8, wherein the locating tab forms a locating block at a free end thereof, and the locating block engages with the locating assembly.

11. The foldable transformer as described in claim 7, wherein the cam is resiliently movable.

12. The foldable transformer as described in claim 7, wherein the protrusion has an arcuate profile.

13. The foldable transformer as described in claim 7, wherein the holding block has a sloped face declining toward a free end thereof, and the projection engages with the sloped face when the plug assembly is rotated to the position in which the inserting pins are accommodated in the storage cavity.

14. The foldable transformer as described in claim 7, wherein the enclosure has a bottom wall located at a bottom of the window, the bottom wall defines a receiving opening therein, and the holding block is received in the receiving opening such that a rear end of the holding block engages with the bottom wall.

15. A foldable transformer comprising:

an insulative enclosure having a storage cavity at a junction of a top face and a front face thereof, and a window defined below the storage cavity;

a plug assembly pivotably mounted in the storage cavity of the enclosure, the plug assembly having an insulative rod, a pair of inserting pins fixed to the rod, and means for electrically connecting the inserting pins with a circuit for power transformation, the rod forming a protrusion and a projection on a circumferential periphery thereof; and a locating assembly fixed to the enclosure, the locating assembly having a cam forming a step on its front face, wherein the protrusion engages with the step when the plug assembly is disposed at a position such that the inserting pins extend outwardly from the storage cavity, the locating assembly further having a holding block below the cam, the projection engaging with the holding block when the plug assembly is rotated to a position in which the inserting pins are accommodated in the storage cavity.

16. A foldable transformer comprising:

an insulative enclosure defining a storage cavity and a window thereabouts;

a plug assembly pivotally mounted in the cavity, said plug assembly including a pair of conductive inserting pins adapted to be rotatable with regard to the enclosure, and a pair of conductive spring pins mechanically and electrically connected to the pair of inserting pins, respectively, said pair of spring pins being stationary relative to the enclosure and adapted to be connected to other electronic devices via wires; and a locating assembly fixed to the enclosure and retainably engaged with the spring pins; wherein said pair of spring pins not only performs electrical function for power transfer, but also provides elasticity to urge the inserting pins in either an exposed position or a hidden position reliably and also to allow the pair of inserting pins to be smoothly rotated between said two positions.

17. The transformer as described in claim 16, wherein said locating assembly defines a pair of slots through which the spring pins extend, respectively.

* * * * *